United States Patent [19]

Wiens

[11] 4,230,216

[45] Oct. 28, 1980

[54] APPARATUS FOR INTERMEDIATELY STORING PRODUCTS ON STORAGE DEVICES

[75] Inventor: Klaus Wiens, Bad Dürkheim, Fed. Rep. of Germany

[73] Assignee: Paper Converting Machine Company, Green Bay, Wis.

[21] Appl. No.: 4,574

[22] Filed: Jan. 18, 1979

[30] Foreign Application Priority Data

Jan. 20, 1978 [DE] Fed. Rep. of Germany ....... 2802339

[51] Int. Cl.³ .......................... B65G 1/06; B65G 1/10
[52] U.S. Cl. ..................................... 198/347; 198/485
[58] Field of Search ............... 198/347, 424, 429, 431, 198/432, 433, 436, 456, 485

[56] References Cited

U.S. PATENT DOCUMENTS

| | | | |
|---|---|---|---|
| 3,470,996 | 10/1969 | Lee et al. | 198/347 |
| 3,499,555 | 3/1970 | Wahle | 198/347 |

*Primary Examiner*—James L. Rowland
*Attorney, Agent, or Firm*—Craig & Antonelli

[57] ABSTRACT

Apparatus for intermediately storing products on a storage device, such as a pallet or the like, comprises an inserter member for feeding products supplied by a conveyor to the storage device. The inserter member is arranged transversely of the conveyor and has a displaceable plunger combined with a planar support surface which is connected to the plunger and which cooperates with a stripper member for returning the intermediately stored products to the conveyor. A discharge member is provided to displace products in storage onto the planar surface support.

8 Claims, 3 Drawing Figures

APPARATUS FOR INTERMEDIATELY STORING PRODUCTS ON STORAGE DEVICES

BACKGROUND AND SUMMARY OF THE INVENTION

The invention relates to apparatus for intermediately storing products on storage devices, such as pallets or the like, wherein the products supplied thereto by a conveyor can be fed to the storage device by means of an inserter member arranged transverse of the conveyor.

Intermediate storage is generally provided for products which travel from a producing machine or from an intermediate wrapping device to the final wrapping arrangement. It is used, inter alia, for the purpose of compensating different capacities of successive machines along a production line, or temporarily storing the arriving products in the case of disturbances in succeeding conveyor belts or machines.

In general, intermediate storage occurs on pallets with automatic loading and unloading. It is essential in this case that the products are returned again to the conveyor in a certain pre-determined geometric arrangement, for further treatment. In order to ensure that the products are accurately displaced from the storage pallet and the products are arranged singly on the conveyor, the present state of the art always requires additional slider members, guides, and the like which increase considerably the financial expenditure for the intermediate storage. Therefore, it is an object of the present invention to provide apparatus for intermediate storage which ensures for a small expenditure for automatic loading and unloading of the intermediate storage devices, and in particular, a reliable return of the stored products to the conveyor, under certain circumstances with predetermined spacing of successive products.

A further object is to omit the auxiliary devices usually required heretofore for perfectly positioning the products during the transfer from the intermediate storage device to the conveyor.

A preferred embodiment of the invention provides apparatus for intermediately storing products on a storage device, such as a pallet or the like, comprising an inserter member for feeding products supplied by a conveyor to the storage device, the inserter member being arranged transversely of the conveyor, and having a displaceable plunger above which is provided a planar support surface which is connected to the plunger and which co-operates with a stripper member for returning the intermediately stored products to the conveyor.

Thus, the advantage is obtained that the inserter member functions simultaneously as an aligning surface and as a positioning aid during the return guidance of the intermediately stored products to the conveyor. Moreover, the inserter member may serve addtionally as a separator device for spacing successive products. In order to use the inserter member in its function as an aligning surface, it is merely necessary to lift the storage pallet slightly, in order that the stored products can be pushed from above on to the support surface connected with the plunger of the inserter member. The vertical displacement of the storage pallet does not necessitate additional production expenditure, since it must be displaceable in any event in a vertical direction in order that its individual layers or stories can be filled successively. Thus, the loading and unloading of the products can occur in the same plane, i.e. the conveyor can always remain at the same level, independently of whether loading or unloading of the storage device takes place.

Preferably, a discharge member for feeding the intermediately stored products to the support surface is arranged on that side of the storage device located opposite the inserter member. The result thereof is an association between inserter member and discharge member which is easily governed in respect of the control technique.

Furthermore, it is advantageous for the stripper member to be adjustable in the transverse direction of the conveyor so that the product is deposited always in the center of the conveyor.

Since the storage pallet is displaceable in the vertical direction, a benefit is obtainable permitting the inserter member to remain vertically stationary, and while the discharge member may also be vertically stationary, it is advantageous to render the discharge member vertically displaceable so as to be at the proper height for engaging and laterally displacing products of various height from the pallet.

Still further, by arranging a plurality of pallets with associated inserter members along the same conveyor, additional advantages can be obtained. For example, products of different condition, for example, different color, can be stored along a conveyor, and a mixed unit may be put together on the conveyor by recall from adjacent stores.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG . 1 is a diagrammatic sectional view of one embodiment of apparatus according to the invention viewed transversely of the direction of the conveyor belt during the loading of the storage pallet.

DETAILED DESCRIPTION OF THE PREFERRED EMBODIMENT

Figure 1:
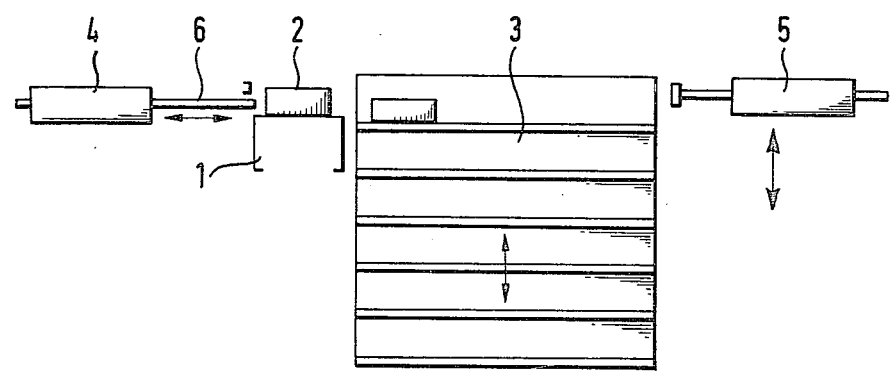

Referring to FIG. 1, products 2 travel on a conveyor belt 1 transversely of and, as shown, normally to the plane of the drawing; for example, from a producing machine to a packaging machine. A vertically displaceable storage pallet 3 is disposed adjacent to and on one side of the conveyor belt 1. It can be loaded by means of an inserter member 4 arranged on the other side of the conveyor belt 1 and can be unloaded by a discharge member 5 arranged on that side of the pallet remote from the conveyor belt.

For loading, the level of the pallet 3 is so adjusted that the layer or story to be charged is located slightly below the travelling plane of the conveyor belt 1, such as illustrated in FIG. 1. Thereupon, a displaceable plunger 6, triggered by an automatic control, pushes the arriving product 2 off the conveyor belt into the adjacent pallet. Thereafter, the plunger 6 moves back and is ready for the insertion of the next following product. When a layer or story of the pallet 3 is fully stacked, it is displaced by the height of a story and the charging process is repeated. In this connection, it is noted that vertically displaceable pallets are known per se, and any conventional reciprocatory mechanism (forming part of inserter 4) can be used to displace the plunger 6, such as a rack and pinion, piston and cylinder, or the like, the manner of implementation of which would be apparent to those of ordinary skill.

Figure 2:
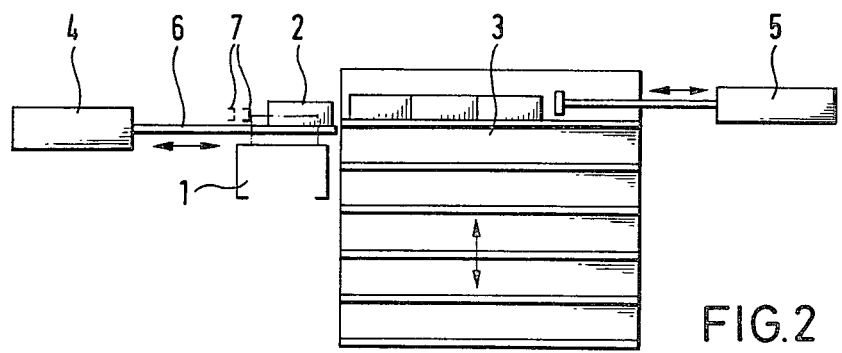
FIG. 2 is a diagrammatic sectional view of the apparatus shown in FIG. 1, but during the unloading of the storage pallet.
Figure 3:
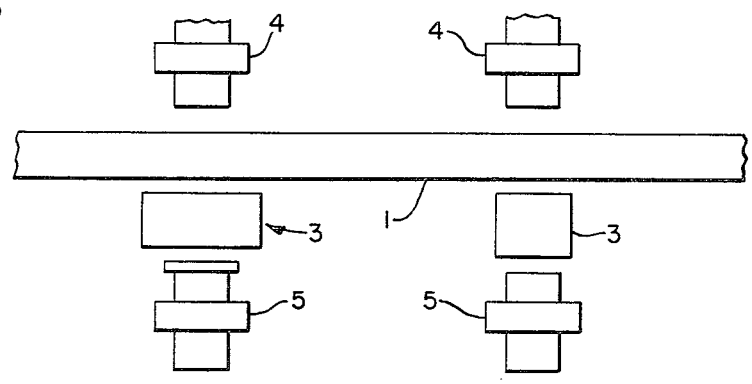
FIG. 3 is a schematic plan view illustrating plural apparatus according to the preferred embodiment positioned along a single conveyor.

For the discharging process illustrated in FIG. 2, the height of the storage pallet must be so adjusted that the products to be pushed out are located slightly above a support surface integrated with the plunger 6 which is of a platform-like construction. When the support surface is located in its advanced position, as illustrated in FIG. 2, the discharge member 5 travels into the pallet for one product width and thereby pushes a product onto the support surface of the plunger 6. A stripper member 7 is displaced from its inactive position (FIG. 1 and dash lines, FIG. 2) to an active position (solid lines, FIG. 2) corresponding positionally to an edge of a product properly centered on conveyor 1. The plunger 6 is then retracted so that the product 2, in abutment with the stripper member 7, is pushed off the plunger 6 onto the conveyor belt 1. It is noted that extension and retraction of the discharge member 5, like platform plunger 6, is carried out by any suitable drive arrangement, such as a rack and pinion or the like. Additionally, a conventional height adjustment mechanism can be used to vertically adjust the height of discharge member 5 for properly contacting and pushing products of differing heights from the storage device 3. After the stripping off process, the stripper member 7 is then displaced back to its inactive position in order not to impede the conveyance of the product away from the storing pallet 3. To provide for delivery of mixed lots, a plurality of inserters, storage devices and discharge members can be positioned along a single conveyor as shown in FIG. 3.

The initiation of the individual member movements and, under certain circumstances the displacement of the stripper member 7, is effected by an automatic sequence control device known per se which operates, for example, with optical or mechanical sensors or, under certain circumstances, with time-controlled pulse transmitters.

Accordingly, it can be seen that the above-discussed embodiment of the invention is advantageous in that the inserter member is combined with a support surface for the products to be guided back. In this manner, it is possible to load and unload the products in one and the same plane and with a centrally aligned re-deposition of the products on the conveyor belt, yet no additional slider members, guides and the like, which substantially increase the cost of the apparatus, are required. Likewise, a simple displaceable abutment can obviate the need for auxiliary positioning devices of the type that have been previously required.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for intermediately storing products on a storage device, such as a pallet or the like, comprising:
    (a) an inserter member for displacing products from a conveyor to a storage device, positioned on one side thereof and arranged for displacement transversely of the conveyor, said inserter member having a displaceable plunger combined with a planar support surface;
    (b) means for discharging stored products onto said planar surface; and
    (c) a stripper member positioned relative to said support surface for returning the intermediately stored products to the conveyor in conjunction with displacement of said plunger.

2. Apparatus according to claim 1, wherein the means for discharging is a discharge member arranged on an opposite side of the storage device with respect to the side on which the conveyor is positioned.

3. Apparatus according to claim 1 or 2, wherein the stripper member is displaceable in the transverse direction of the conveyor to and from an inactive position and a position corresponding to an edge of a product centered on the conveyor.

4. Apparatus according to claim 2, wherein the discharge member is vertically displaceable.

5. Apparatus according to claims 1 or 2, wherein a plurality of storage devices and associated inserter members are arranged along the conveyor.

6. Apparatus according to claim 3, wherein a plurality of storage devices and associated inserter members are arranged along the conveyor.

7. Apparatus according to claims 1 or 2, wherein the storage device is vertically adjustable to and from a receiving position below an upper surface of the conveyor and a discharge position above said planar support surface.

8. Apparatus according to claim 3, wherein the storage device is vertically adjustable to and from a receiving position below an upper surface of the conveyor and a discharge position above said planar support surface.

* * * * *